(12) United States Patent
Khayrallah

(10) Patent No.: US 8,804,883 B2
(45) Date of Patent: Aug. 12, 2014

(54) METHOD AND APPARATUS FOR REDUCED INTERFERENCE SIGNAL DEMODULATION

(75) Inventor: Ali S. Khayrallah, Cary, NC (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 3181 days.

(21) Appl. No.: 10/863,299

(22) Filed: Jun. 8, 2004

(65) Prior Publication Data

US 2005/0271170 A1 Dec. 8, 2005

(51) Int. Cl.
*H03D 1/04* (2006.01)
*H04L 25/03* (2006.01)
*H04L 1/06* (2006.01)
*H04L 25/02* (2006.01)

(52) U.S. Cl.
CPC ...... *H04L 25/0328* (2013.01); *H04L 25/03006* (2013.01); *H04L 25/03197* (2013.01); *H04L 1/06* (2013.01); *H04L 25/0204* (2013.01)
USPC ......................................... 375/346

(58) Field of Classification Search
USPC .................. 375/346, 340, 341, 348, 349, 350
See application file for complete search history.

(56) References Cited

U.S. PATENT DOCUMENTS

| | | | | |
|---|---|---|---|---|
| 6,173,014 B1 * | 1/2001 | Forssen et al. | ................ | 375/267 |
| 6,249,518 B1 | 6/2001 | Cui | | |
| 6,314,147 B1 * | 11/2001 | Liang et al. | .................... | 375/346 |
| 6,496,534 B1 * | 12/2002 | Shimizu et al. | ............... | 375/148 |
| 6,693,983 B1 * | 2/2004 | Moher et al. | ................... | 375/341 |
| 6,745,050 B1 | 6/2004 | Forsythe et al. | | |
| 6,907,092 B1 * | 6/2005 | Yakhnich et al. | ............. | 375/346 |
| 7,158,585 B2 * | 1/2007 | Jones et al. | ................... | 375/316 |
| 7,324,437 B1 * | 1/2008 | Czylwik et al. | ............... | 370/210 |
| 2002/0159547 A1 * | 10/2002 | Lindoff et al. | ................ | 375/343 |
| 2004/0022302 A1 | 2/2004 | Olson et al. | | |
| 2004/0170234 A1 * | 9/2004 | Pukkila et al. | ................ | 375/340 |
| 2004/0192215 A1 * | 9/2004 | Onggosanusi et al. | ..... | 455/67.13 |

FOREIGN PATENT DOCUMENTS

CN  1407748 A  4/2003

OTHER PUBLICATIONS

Wikipedia, Viterbi decoding Wpb p. 2009.*
Schlegel et al., "Multiuser Projection Receivers," IEEE Journal on Selected Areas in Communication, , Oct. 1996, pp. 1610-1617, vol. 14, No. 8.
Shinoi et al., "Performance of Multicarrier Trellis-Coded Slow-FH/16QAM with an Interference Immunity Decoding," Personal, Indoor and Mobile Radio Communications 1997, Waves of the Year 2000, PIMRC '97, The 8th IEEE International Symposium on Helsinki, Finland, Sep. 1, 1997, pp. 221-225, vol. 1.
Yu-Yi Cheng et al., "Blind near-map selection diversity with multi-user detection for multi-user OFDM," IEEE Wireless Communications and Networking Conference, Mar. 21, 2004, p. 939-940, XP010708256.

* cited by examiner

*Primary Examiner* — Jaison Joseph
(74) *Attorney, Agent, or Firm* — Coats and Bennett, P.L.L.C.

(57) ABSTRACT

A method and apparatus carry out received signal processing for received communication signals based on least squares processing to estimate the contribution of one or more interferer signals. The exemplary receiver uses interferer signal channel estimates to obtain least squares estimates for the interference contributions of one or more interferer signals, and then uses those estimates to suppress interference during demodulation processing. Further, the least-squares estimates may be used to obtain a reduced search space wherein the candidate set of signals searched during demodulation processing is reduced.

39 Claims, 7 Drawing Sheets

METHOD AND APPARATUS FOR REDUCED INTERFERENCE SIGNAL DEMODULATION

BACKGROUND OF THE INVENTION

The present invention generally relates to communication signal processing and particularly relates to demodulating such signals.

Accurate recovery of the originally transmitted information from a received communication signal presents significant challenges in the context of wireless communication systems, such as wireless Local Area Networks (LANs) and, in particular, mobile radio networks. Mobile communication networks for example represent particularly challenging environments, because of the rapidly fading propagation channels, multi-user interference, etc.

In a common approach to information recovery, received signals are demodulated based on comparing sampled portions of the incoming signal to hypotheses representing possible values of the received signal. Such approaches suffer because the comparison is polluted by unaccounted for interference and thus it is difficult to know whether comparison results reflect good or bad hypotheses, or simply reflect the effects of unaccounted for noise. Further, particularly in the context of complex transmit signal modulation constellations, the number of candidate signals that must be evaluated to identify the received signal becomes prohibitively large with respect to the amount of time normally available to process signals in real or near real-time.

One alternative to the above approach to demodulation involves so-called joint detection, wherein the receiver jointly detects and demodulates desired and interfering signals together. With the signal information thus gained for the interferer signal, suppression of the interference arising from it is a relatively straightforward proposition. However, the niceties gained in interference suppression are more than offset by the attendant increase in demodulation complexity arising from the joint detection itself.

SUMMARY OF THE INVENTION

The present invention comprises a method and apparatus for received processing wherein least squares processing is used to estimate the contribution of one or more interferer signals. With this configuration, the exemplary receiver uses interferer signal channel estimates to obtain a least squares estimates of one or more interferer signals, and then uses those estimates to suppress interference during demodulation processing. Further, the least squares estimates may be used to obtain a reduced search space, wherein the candidate set of signals searched during demodulation processing is reduced.

Therefore, an exemplary method of suppressing interference in a received signal that includes a desired signal comprises estimating one or more interference components via least squares estimations based on interferer signal channel estimates, and demodulating the received signal to recover the desired signal based at least in part on the interference components. Estimating the interference components in this context comprises estimating an interference component of the received signal for each one in a set of desired signal hypotheses.

In another exemplary embodiment, the method comprises generating a first residual between the received signal and each of one or more candidate signals postulated as the desired signal, calculating an interference component for each first residual as a least squares estimate, generating a second residual from each first residual by removing the corresponding interference component, and determining a best candidate signal by evaluating the second residuals.

The evaluation of the second residuals can be unconstrained, wherein the candidate signal corresponding to the best second residual is selected as the best candidate for the received signal without expressly evaluating the apparent validity of the second residual. However, exemplary demodulation processing can be configured to consider whether the estimated interference component giving rise to the best second residual is rational in light of known or presumed transmit signal characteristics of the interferer signal. For example, the exemplary receiver can use the inverse interferer channel to transpose the estimated interferer back into the transmit signal space and determine whether thus transposed it makes sense in terms of, for example, known modulation envelope bounds. If the estimate is not rational, the receiver can use alternative approaches to identifying the best candidate or can clip the estimate such that it falls within the applicable bounds.

According to one or more of the above embodiments, a receiver circuit for suppressing interference in a received signal that includes a desired signal comprises one processing circuit configured to generate a first residual between the received signal and each of one or more candidate signals postulated as the desired signal. The processing circuit or circuits further are configured to calculate an interference component for each first residual as a least squares estimate, generate a second residual from each first residual by removing the corresponding interference component, and determine a best candidate signal by evaluating the second residuals.

In another exemplary receiver circuit embodiment, the receiver circuit comprises a trellis demodulator configured to demodulate the received signal to obtain the desired signal using trellis demodulation, wherein the trellis demodulator includes a least squares estimation circuit configured to generate least squares estimates of interference at one or more trellis stages and further configured to calculate branch metrics for moving from those stages based at least in part on the estimates of interference.

The above exemplary details are discussed in the following discussion and illustrated in the accompanying drawings. Additional features and advantages will become apparent to those skilled in the art upon reading that discussion, and upon viewing those drawings.

DETAILED DESCRIPTION OF THE INVENTION

Figure 1:
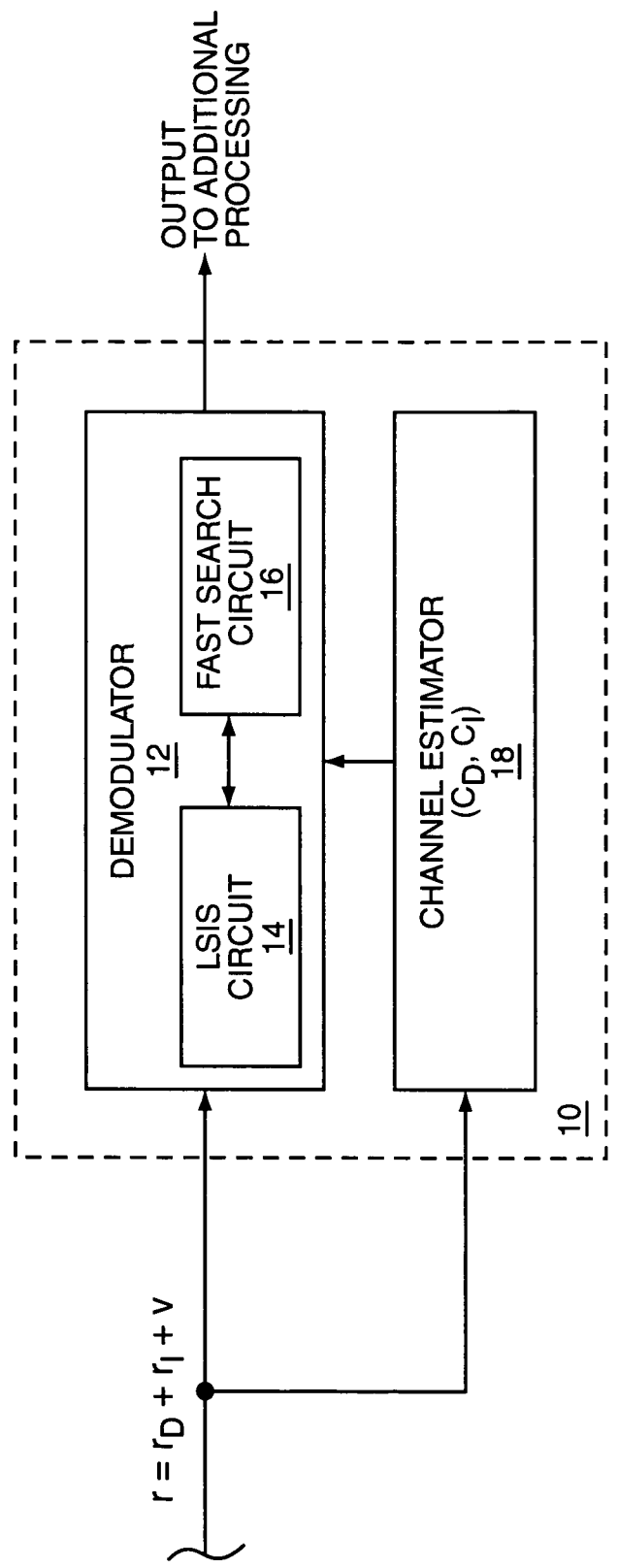
FIG. 1 is a diagram of an exemplary processing circuit for implementing interference suppression and other demodulation signal processing in accordance with one or more embodiments of the present invention.

In broad terms the present invention comprises a method and apparatus for received signal demodulation wherein interferer signal knowledge is exploited to suppress interference and/or to reduce the candidate search space for received signal hypothesis testing. In the context of this discussion, the received signal is considered to have a "dimensionality" greater than the dimensionality of a desired signal that is received as part of an overall received signal that also includes one or more interferer signals. In this sense, the greater dimensionality of the received signal simply means that the receiver has the ability to make a greater number of observations than there are unknowns with respect to the transmitted desired signal.

Extra dimensionality may be obtained by the receiver including a greater number of receive antennas than were used to transmit the desired signal. Extra dimensionality also can be obtained even with a single receiver antenna where the receiver has excess bandwidth with respect to the desired signal. By way of non-limiting examples, the exemplary receiver gains the required extra dimensionality in GSM systems through the use of multiple receiver antennas. For WCDMA configurations, the exemplary receiver may exploit the extra dimensionality inherent in WCDMA system with a single receiver antenna, or may use multiple receiver antennas.

Thus, it should be understood that the present invention is applicable to a wide range of communication systems and is not limited to any particular network type. With that in mind, exemplary received signal processing, including aspects of interference suppression and signal demodulation, may be best understood by examining a scenario with one desired signal and one interferer signal, each transmitted from M antennas, and received at an exemplary receiver with N antennas. Note that if the desired signal and interferer signal have different numbers of transmit antennas, M will be treated as the larger number of transmit antennas. The M-dimensional vector $s_D$ represents the desired signal, while M-dimensional vector $s_I$ represents the interferer signal. Values of $s_D$ and $s_I$ generally are limited to finite signal constellations. For example, they both may be limited to values defined by the signal constellation S. The respective signal formats of the desired and interfering signals define the associated constellations, such as 8PSK and/or 16QAM.

Signals $s_D$ and $s_I$ are transmitted over fading channels represented by matrices $C_D$ and $C_I$, respectively. Note that for multi-code transmission, such as in the WCDMA downlink, the signals transmitted from an interfering base station can be treated as a single interferer, whose signal constellation is a composite of all the codes. With this framework, the received signal includes both desired and interferer components, as well as interference plus noise. The received signal thus may be represented by an N-dimensional vector r that can be written as, $$r = r_D + r_I + v = C_D s_D + C_I s_I + v, \quad (1)$$

where $r_D$ represents the contribution of the desired signal $s_D$, $r_I$ represents the contribution of the interferer signal $s_I$, and v is a mix of all other interferers and internal and/or external noise, modeled as complex white Gaussian noise. As noted later herein, the use of "interferer" and "desired" labels with respect to received signals is used to indicate which particular signal is of interest. Thus, a receiver might receive a composite signal that includes multiple desired signals and for any one of those desired signals the remaining desired signals are considered interferers.

Exemplary signal demodulation as proposed herein exploits knowledge of the interferer signal's channel. In one embodiment, demodulation treats the interferer signal as an unconstrained variable wherein the estimates of its contribution to the received signal are based on least squares estimation. In another embodiment, processing is constrained inasmuch as the interference contribution of the interferer signal determined from least squares processing is constrained to a range that makes sense in light of transmit signal characteristics known or presumed for the interferer signal. Such a constraint therefore may be thought of as imposing a validity or rationality test to the interference estimation results.

In looking at an exemplary general approach according to the present invention, suppressing interference in a received signal that includes a desired signal comprises estimating one or more interference components via least squares estimations based on interferer signal channel estimates, and demodulating the received signal to recover the desired signal based at least in part on those estimated interference components. Details for this exemplary interference suppression are given later herein, while FIG. 1 provides a broader overview of exemplary processing.

FIG. 1 illustrates an exemplary embodiment of the present invention comprising one or more receiver processing circuits 10 that include a demodulator 12 having a Least Squares Interference Suppression (LSIS) circuit 14 and, optionally, a fast search circuit 16, and that further includes a channel estimator 18 configured to provide both desired signal channel estimates, $C_D$, and interferer signal channel estimates, $C_I$. In an exemplary embodiment, channel estimator 18 is configured to estimate the interferer signal channel estimates based on pilot or other reference signals originating from the interfering transmitter. For example, in a wireless communication network embodiment, neighboring base stations generating one or more interferer signals also would transmit pilot signals thereby allowing estimation of the interferer signal propagation channels.

Figure 2A:
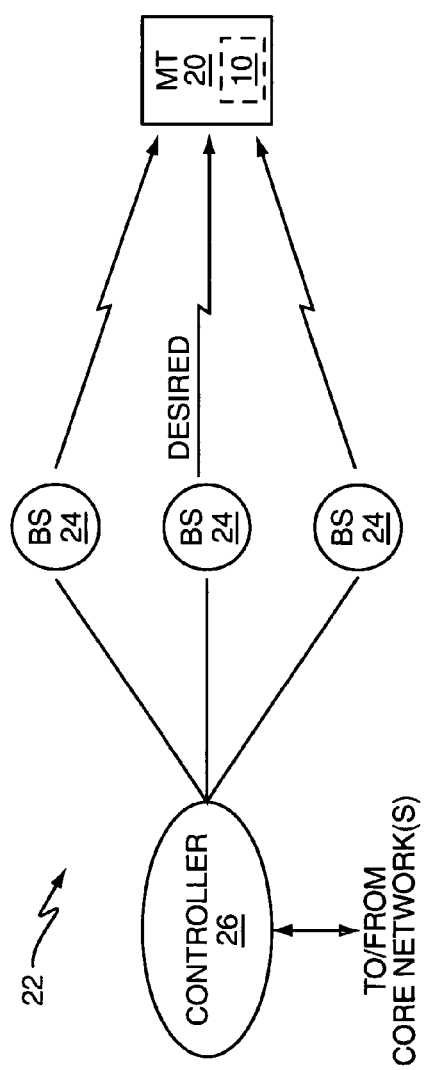
FIG. 2A is a diagram of at least a portion of an exemplary wireless communication network.

Thus, while not limited to such applications, the exemplary processing circuits 10 may be implemented, as illustrated in FIG. 2A, in a mobile terminal 20 configured for use in a wireless communication network 22 that is depicted as comprising in part one or more base stations 24 that are communicatively coupled to one or more core networks through a controller 26. Those skilled in the art will appreciate that an actual implementation of network 22 typically will include additional entities not illustrated here. Additionally, those skilled in the art will appreciate that the architecture of network 22 depends at least to some extent on the particular network standards involved.

Figure 2B:
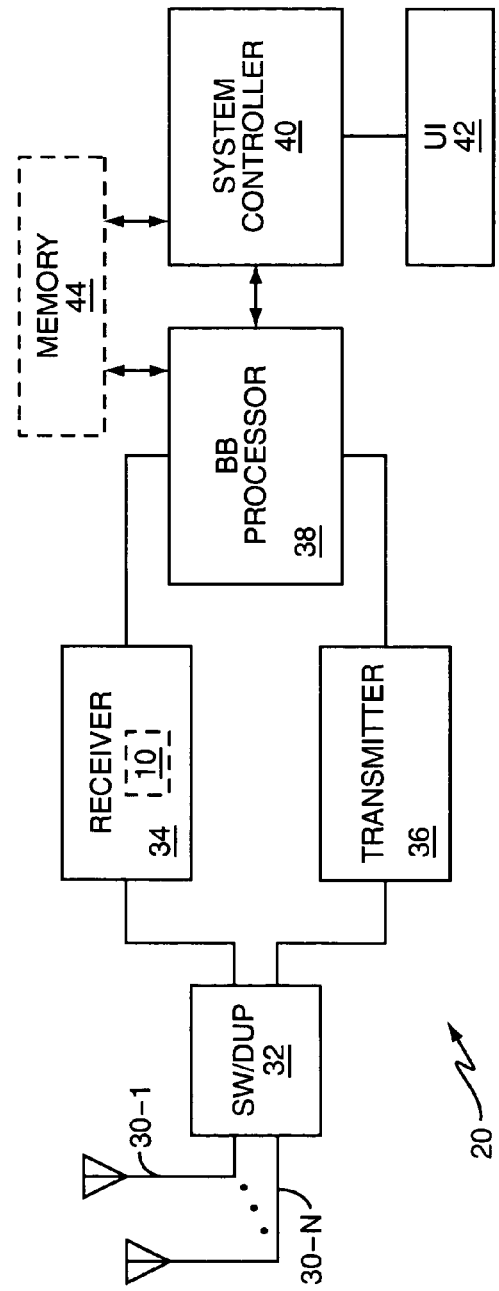
FIG. 2B is a diagram of an exemplary wireless communication device, e.g., a mobile terminal, including the processing circuit of FIG. 1 according to any of its embodiments.

FIG. 2B illustrates an exemplary embodiment from mobile terminal 20 that includes two or more antennas 30-1 ... 30-N, a switch/duplexer circuit 32, a receiver 34, a transmitter 36, a baseband processor 38, a system controller 40, a user interface 42, and one or more memory devices 44. The exemplary receiver 34 includes some or all of the processing elements previously described as being associated with receiver processing circuits 10 and thus mobile terminal 20 is configured to carry out received signal demodulation in accordance with the present invention.

Also, while this diagram provides a meaningful basis for discussing various aspect of the exemplary receivers operation, it should be understood that the diagram is not limiting with respect to the present invention. For example, baseband processor 38 may comprise one or more integrated circuits that are configured to perform at least some of the functions that are identified by the receiver 34 and transmitter 36. Thus, receiver processing circuits 10 which are used to carry out exemplary reduced interference signal demodulation may themselves be included as part of a larger functional element.

Figure 3:
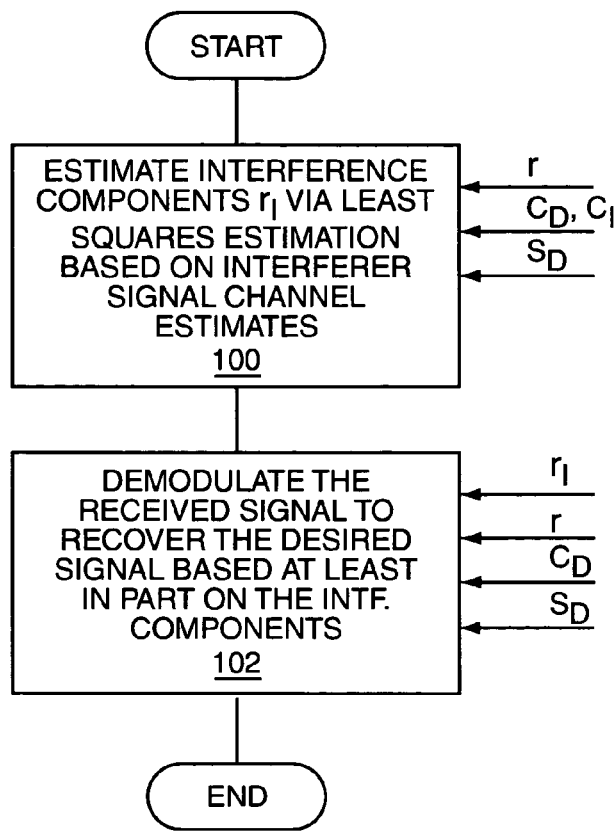
FIG. 3 is a diagram of exemplary signal processing according to one or more embodiments of the present invention.

In any case, FIG. 3 illustrates exemplary processing logic that may be implemented to carry out one or more embodiments of the present invention. Such processing logic can be implemented in hardware, software, or some combination thereof. Suitable hardware includes but is not limited to one or more Application Specific Integrated Circuits (ASICs), Programmable Logic Devices (PLDs), Field Programmable Gate Arrays (FPGAs), or other discrete or integrated processing circuits. Suitable software implementations may be based on one or more microprocessors, microcontrollers, Digital Signal Processors, etc., executing firmware, software, microcode, etc.

Regardless, processing begins using one or more samples of a received signal that includes a desired signal component and one or more interferer signal components. The samples may comprise values corresponding to one or more modulation symbols, sequences of symbols, etc. depending on the particular type of signal being received (GSM, WCDMA, etc.) and on the particular implementation of the front-end circuit included in receiver 34. In any case, exemplary receiver processing operates on received signal samples, e.g., baseband samples, that include desired and interferer signal components.

According to the present invention, demodulation of the received signal incorporates a least squares interference suppression method which allows the receiver to suppress interference associated with interfering signals without having to expend the computational resources needed to demodulate and/or specifically process those signals. More particularly, the exemplary receiver generates both desired signal channel estimates and interference signal channel estimates (Step 100) and then uses the interferer signal channel estimates to make least-squares estimations of interference components in the received signal to thereby improve recovery of the desired signal (Step 102).

In a basic approach to demodulation herein, processing circuits 10 are configured to recover the desired signal by determining the best one in a number of hypotheses, i.e., "candidate signals," for the received desired signal. More particularly, for each desired candidate signal $s_{D,k}$ in a set of candidate signals representing desired signal hypotheses, i.e., for each $s_{D,k}$ in the set $S=\{s_{D,1}, s_{D,2}, \ldots, s_{D,L}\}$, the exemplary processing circuits 10 are configured to compute a first residual based on subtracting a "channelized" version of the candidate signal from the composite received signal as $$\text{res1}_k = r - C_D s_{D,k}. \tag{2}$$

The channelized version of the candidate signal thus is obtained simply by applying the desired signal channel estimate to the candidate signal such that it is altered from its nominal value in substantially the same way the received desired signal is altered from its nominal value by passing through the actual propagation channel.

If the candidate signal $s_{D,k}$ is a poor guess for the desired signal $r_D$, the first residual $\text{res1}_k$ obviously will be non-zero. However, even if $s_{D,k}$ is exactly the as as-transmitted value of $r_D$, $\text{res1}_k$ still will be non-zero because, setting aside any differences between the candidate signal value and the actual desired signal value, $\text{res1}_k$ includes a portion arising from channel estimation errors, and a portion arising from interference and noise.

With this in mind, one sees that identifying the best hypothesis $s_{D,k}$ from the set s for the desired signal based on just the first residuals is complicated because the differences arising between the composite received signal and the receiver's hypothesized "guesses" for the received signal are polluted by the interference and noise. Thus, without more information, it is hard to know how much of the first residual generated for each hypothesis is accounted for by candidate error, and how much of it is accounted for by noise, interference, and channel estimation error. (It should be noted that the interference almost always is the most significant of the unaccounted for terms.)

Figure 4:
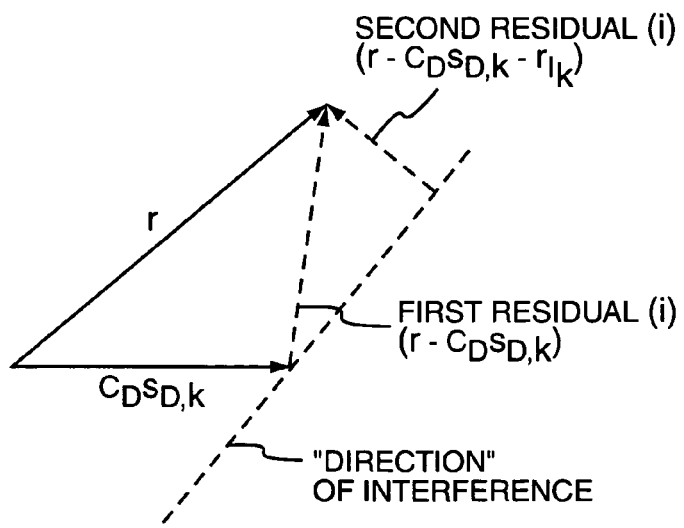
FIG. 4 is a diagram illustrating one example of resolving a received signal into desired and interferer residual components.

The exemplary receiver processing circuit 10 improves candidate signal selection by accounting for the interference contribution of the interferer signal(s) to each one of the first residuals. More particularly, the exemplary receiver processing circuit 10 is configured to generate a least-squares estimate of the interference component in each first residual, and generate corresponding second residuals by removing the interference components from the respective first residuals. FIG. 4, while not intended to be a limiting representation of the methodology, provides an exemplary graphical illustration of these operations.

In FIG. 4, one sees that for each candidate signal $s_{D,k}$ the received signal may be considered as comprising a first component represented by $C_D s_{D,k}$, and a second component comprising the first residual, namely, $\text{res1}_k = (r - C_D s_{D,k})$. Further, one sees that the interference portion of the first residual can be estimated according to a second residual given as $$\text{res2}_k = r - C_D s_{D,k} - \tilde{r}_I[s_{D,k}], \tag{3}$$

where $\tilde{r}_I[s_{D,k}]$ comprises a Least-Squares estimate of the interference component.

Least squares processing fundamentally estimates one or more parameters of a statistical model as the quantity or quantities that minimize the sum of squared differences between the observed values of the dependent variable and the values predicted by the model. In the exemplary receiver, understanding the least squares estimation processing may be more clearly understood by supposing s is an M-dimensional variable, and that r is an N-dimensional noisy observation, given by $$r = Cs + v, \tag{4}$$

where v is a noise vector. The least squares (LS) estimate of s is thus given by $$\tilde{s} = (C^h C)^{-1} Cr. \tag{5}$$

The dimensional relationship N≥M must hold for the inverse in (5) to exist. Under the usual Gaussian assumptions, $\tilde{s}$ becomes the maximum likelihood estimator for s. The vector corresponding to $\tilde{s}$ is given as $$\tilde{r} = C\tilde{s} = C(C^h C)^{-1} Cr. \tag{6}$$

When N>M, this estimate of r generally will be different from r, indicating that the exemplary receiver can distinguish between signal and noise.

Having discussed the least squares method, the discussion may return to the exemplary receiver description. The interferer signal contribution to each first residual—i.e., the portion of each first residual accounted for by interference—can be estimated via least-squares processing as $$\tilde{r}_I[s_{D,k}] = C_I (C_I^h C_I)^{-1} C_I (r - (r - C_D s_{D,k}). \tag{7}$$

Recall that M refers to the largest of the number of transmit antennas of the signal and that of the interferer. Here, we focus on the number M of transmit antennas of the interferer. Note that if the number N of receive antennas exceeds M, then the LS receiver will be able to distinguish between the interferer signal contribution to the first residual, and noise. As is seen, this least squares processing approach makes use of the receiver's knowledge of the interferer signal channel estimates but does not require demodulation of the interferer signal or other computationally prohibitive operations to gain special knowledge of the interferer signal contents.

Selection of the best candidate signal thus is improved by obtaining second residuals through suppressing the interference component from each of the first residuals. The best candidate search is carried over all candidates in the set S, while accounting for $\tilde{r}_I[s_{D,k}]$, to produce $\hat{s}_D$ estimate SD as the best candidate for the desired signal. This evaluation may be expressed as $$\hat{s}_D = \arg \min_s \{\|r - C_D s - \tilde{r}_I[s]\|\}. \quad (8)$$

Thus, the exemplary receiver processing circuit 10 is configured to determine the best hypothesis for the received desired signal by accounting for the interference contribution of the interferer signal to the first residual obtained for each hypothesis. More particularly, the exemplary receiver is configured to calculate the interference contribution of the interferer signal using least squares processing with respect to each candidate signal based on the first residual determined for that candidate signal. The corresponding interference contribution is then removed from each first residual to obtain a set of second residuals, one for each of the candidate signals being tested as part of demodulation.

Figure 5:
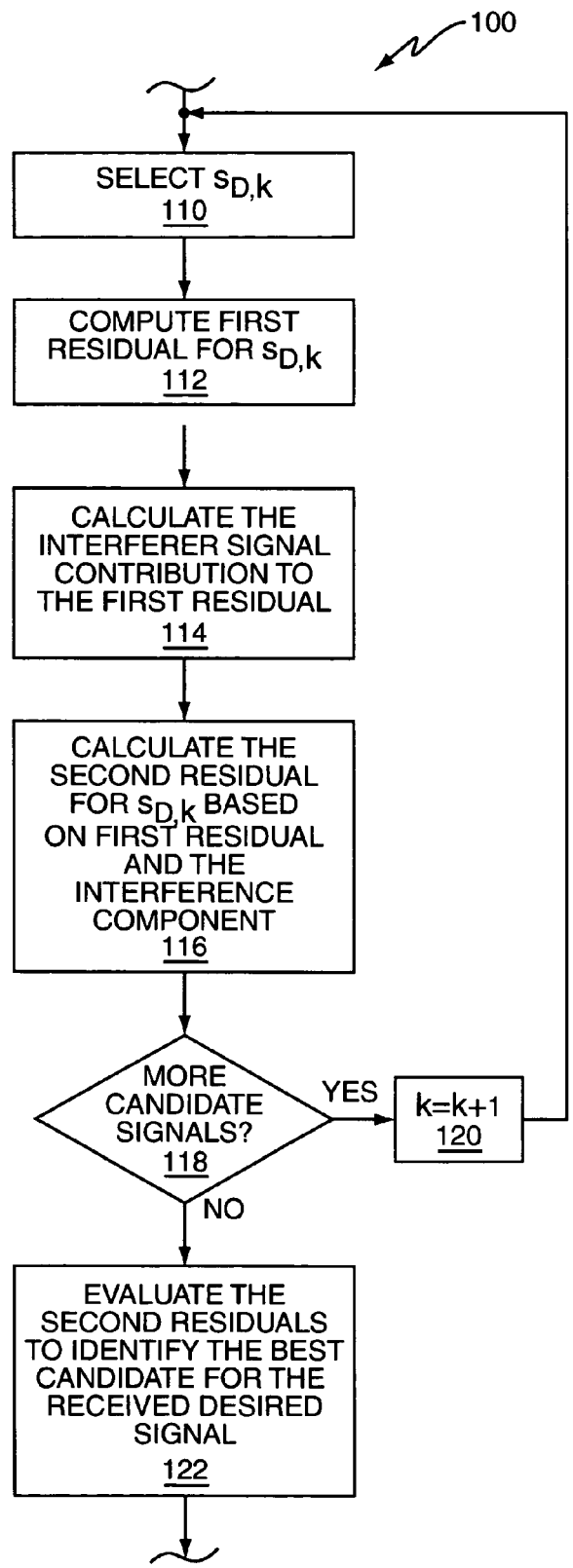
FIG. 5 is a diagram of exemplary details corresponding to the processing logic of FIG. 3.

FIG. 5 illustrates exemplary processing logic for carrying out the above method, which can be implemented by processing circuit 10 in hardware, software, or some combination thereof. Assuming that one or more received signal samples of interest are available, processing "begins" with selection of the first candidate signal $s_{D,k}$ (Step 110). Processing continues for the selected candidate signal $s_{D,k}$ with computation of the corresponding first residual as given above in (2) (Step 112). Least squares processing then is used to estimate the interference component of the first residual as given above in (7) (Step 114). With the interference component thus estimated, processing begins with calculation of the second residual for the selected candidate signal as given above in (3) (Step 116).

If there are more candidate signals in the hypothesis set (Step 118), then processing continues with selection of the next candidate signal (Step 120), and the first residual, interference component, and second residual calculations are repeated for the next candidate signal. Processing the candidate set S in this manner yields a set of second residuals that may be evaluated to determine the candidate signal $s_{D,k}$ that best matches the received desired signal. The best candidate signal's values can then be taken as representing the received desired signal and processed as needed or desired. The above demodulation process repeats as an ongoing process for the incoming received signal.

Figure 6:
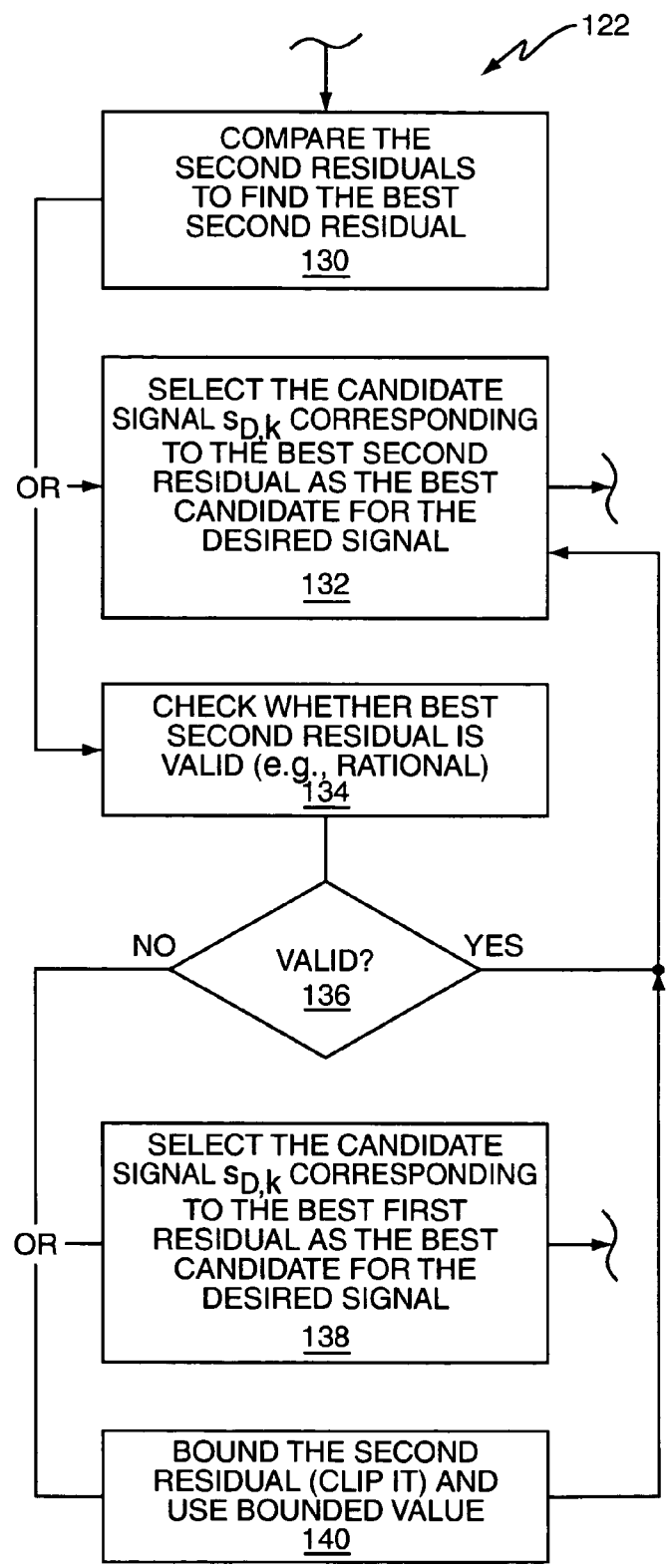
FIG. 6 is a diagram of further exemplary processing details.

Significant flexibility exists regarding the evaluation of second residuals in accordance with the present invention. FIG. 6 illustrates several exemplary variations for the evaluation process embodied in Step 122 above. For example, identification of the best candidate signal may comprise comparing the second residuals and identifying the best (e.g., smallest) second residual as given above in (8) (Steps 130 and 132). That evaluation method is considered as unconstrained demodulation because it imposes no constraints on the estimated interference components that were removed from the respective first residuals to obtain the second residuals.

With that in mind, an alternative, constrained approach is to identify the best second residual as above, but further to determine whether the interference component estimated for that best second residual represents a rational estimate of interference with respect to the interferer signal known or presumed to give rise to the interference (Step 134). The exemplary receiver may know or may presume the interferer signal's modulation type and can thus evaluate whether the estimated interference component is a rational estimate of interference given the known or presumed transmit characteristics of the interferer. By way of example, the receiver may know or presume that the interferer signal is a 16 QAM signal with a known, bounded modulation envelope.

Thus, the receiver can evaluate whether the estimated interference component corresponding to the best second residual is rational, or otherwise valid, by applying the inverse interferer signal channel estimate to the interference component. That operation yields an as-transmitted signal magnitude in the transmit signal space of the interferer signal. Continuing with the 16QAM example, if the magnitude of the estimated interference component translated into the transmit signal space of the interferer signal exceeds the modulation limits of the 16QAM transmit signal, then the estimated interference component is not rational. Of course, other transmit signal characteristics may be evaluated in addition, or as an alternative, to evaluating the modulation envelope bounds.

In any case, if translation of the interference component into the transmit signal space of the interferer signal does not result in a sensible result (Step 136), the exemplary processing circuit 10 can be configured to fall back to evaluating the first residuals to determine the best candidate for the desired signal (Step 138). In that respect, evaluation of the first residuals is like or similar to evaluation of the second residuals in that the processing circuit 10 may be configured to pick the best first residual and choose the corresponding candidate signal as the best one among the hypotheses (Step 138). Alternatively, processing circuit 10 can be configured to proceed with demodulation based on using the smallest second residual but in this case it can bound or otherwise clip its value such that it comports with the limitations of the known or presumed transmit signal characteristics (Step 140).

Figure 7:
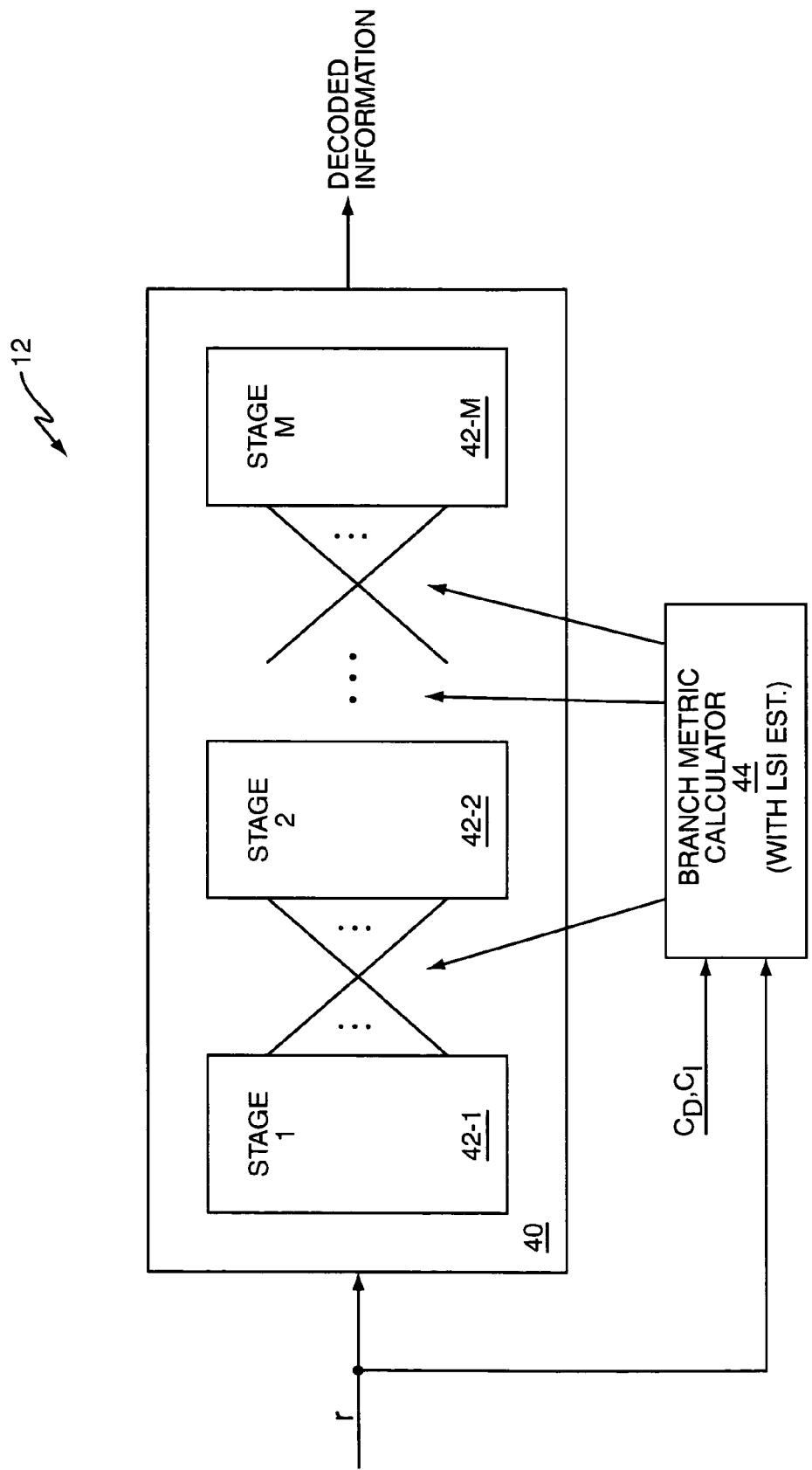
FIG. 7 is a diagram of another exemplary embodiment of a demodulator/decoder comprising the processing circuit of FIG. 1.

As a further alternative, and as an additional point of flexibility with regard to the present invention, FIG. 7 illustrates another embodiment of demodulator 12 of processing circuit 10 that is configured as a trellis decoder 40 including a plurality of successive decoding stages 42-1 . . . 42-M, and a branch metric calculator 44 that includes an exemplary least squares interference suppression circuit 14 that is consistent with the configurations described earlier herein.

In this embodiment, the least squares estimates of interference components are used to weight the branch metrics used by the trellis decoder to move through the successive decoding stages. Thus, branch metric computation benefits from interferer signal suppression based on least squares estimations of interferer signal components as in the above embodiments.

Beyond the interference suppression in the branch metrics, the trellis demodulation/decoding procedure may otherwise be unchanged. Thus, a maximum likelihood (ML) or a maximum a posteriori (MAP) iterative procedure can be implemented in demodulator 12. Further, the structure of the trellis decoder 40 itself can be a complete structure (ML), or a reduced state structure (RSSE or DFSE, or M-algorithm).

In considering other aspects of the present invention, it also should be noted that exemplary receiver may receive multiple desired signals and apply exemplary demodulation as described herein to each one of those desired signals. On that point, while processing a given one of the desired signals, the remaining desired signals may be treated as interferer signals. The term interferer signal thus should be given a broad construction herein. Further, with respect to the point that the received signal may include multiple interferer signals, it should be noted that processing circuit 10 can be configured to address multiple interferer scenarios in any number of ways.

For example, least squares interference suppression as described herein may be based on acquiring channel estimations for each of the multiple interferers whereupon the exemplary processing circuit 10 would subtract them jointly by estimating the contribution of all interferer signals simultaneously. Alternatively, the exemplary processing circuit 10 can be configured for sequential operation wherein it estimates the largest interference component first, removes that component to generate a first interference-reduced residual, then estimates the second largest interference component and subtracts it from the first interference-reduced residual to obtain a second interference-reduced residual, and so on.

With the above demodulation processes in mind, the present invention optionally further contemplates additional demodulation performance benefits by reducing the demodulation search space. In other words, the above processing involving candidate signal selection involved operations performed on each one in a set of candidate signals representing hypotheses for the desired signal. Thus, overall processing time and/or processing complexity in such embodiments depend on the candidate set size.

In FIG. 1, the exemplary receiver processing circuits 10 were depicted as optionally including a fast search circuit 16 and in an exemplary embodiment or processing circuit 10, the fast search circuit 16 is configured to carry out "spherical detection" search space reduction methods in the transmit signal space of the desired signal. This is explained in more detail below but in broad terms the exemplary receiver uses its knowledge of the interferer signal channel estimates to obtain an initial estimate of the desired signal, and then moves that estimate into the desired signal transmit space (e.g., moved into the nominal transmit signal symbol modulation constellation). Spherical detection then is applied within the transmit signal space of the desired signal to generate a reduced size candidate signal set S.

Spherical detection thus offers faster demodulation by reducing the candidate signals subject to evaluation, and its advantages become particularly notable in the context of large modulation constellations (i.e., 32QAM, 64QAM, etc.). In general, a maximum likelihood (ML) or maximum a posteriori (MAP) decision device must consider all possible candidates for the transmitted signal in order to produce an output. In communication problems with additive Gaussian noise and under reasonable SNR conditions, the likelihood of a candidate signal being a match for the received desired signal drops very quickly as a function of the appropriate distance between the candidate and the received signal. The term "distance" as used here connotes the appropriate N-space metric according to the dimensionality of the applicable modulation constellation.

A decision device with a search restricted to candidates with high likelihood generally performs about as well as one with a global search in terms of identifying the best candidate but does so at potentially much higher performance. That point underlies the basic idea behind spherical detection and similar fast search techniques contemplated herein. Consider the simple communications scenario with a single real signal in real AWGN, given by $$r = s + n, \quad (9)$$

where s is a column vector representing a real multi-dimensional signal, n is a vector of real white Gaussian noise, and r is a real received vector. The basic function of a decision device is to search for the best candidate for the transmitted signal. More sophisticated arrangements, such as multi-user, MIMO, multiple transmit and receive antennas, etc., can present very complicated modulation constellation scenarios and thus the optional implementation of fast search circuit 16 in processing circuit 10 becomes increasingly advantageous in circumstances where the desired signal's constellation has many points and multiple dimensions.

Fast searching with regard to received wireless communication signals can be modeled as $$r = Cs + v, \quad (10)$$

where C represents the complex fading channel, and can account for multiple transmit and receive antennas. Also s is a complex signal, and v is complex noise. Since modulation lattices traditionally have been studied over real numbers, it may be helpful to discuss such lattices in more detail. The discussion also provides information regarding variations that work without a lattice structure, which is important for the case of PSK.

An N-dimensional (modulation) lattice L can be defined by a basis of N independent vectors with M dimensions, where M≥N. The elements of the basis vectors are real numbers. The (M×N) generator matrix G contains the basis vectors as its columns. An element s of L is determined by a vector u of N integers as follows:

$$s = Gu. \quad (11)$$

For additional related information, one may refer to H. Conway and N. Sloane, "Sphere Packings, Lattices, and Groups," (Spring-Verlag, 3rd Ed. 1999).

The restriction of the elements of u to integers creates a discrete set with a regular repeating structure. In the modulation context, the vector u represents the information. For N=2, the simple even lattice is given by $$G = \begin{pmatrix} 2 & 0 \\ 0 & 2 \end{pmatrix}^T. \quad (12)$$

Clearly it contains the origin $(0,0)^T$. QAM modulation is related to this lattice. Usually, QAM is defined with an offset from the origin. It can be interpreted as shifted version of the even lattice, given by $$s = Gu - (1,1)^T. \quad (13)$$

The actual finite modulation constellation is determined by carving out a finite subset of the infinite size lattice. Another example is the hexagonal lattice given by $$G = \begin{pmatrix} 1 & 0 \\ \frac{1}{2} & \frac{\sqrt{3}}{2} \end{pmatrix}^T. \quad (14)$$

An equivalent representation is given by $$G = \begin{pmatrix} 1 & -1 & 0 \\ 0 & 1 & -1 \end{pmatrix}^T. \quad (15)$$

(One can create equivalent lattices by scaling, rotation, reflection, etc.) The 3-dimensional version of this lattice gives the "stack of oranges". It can be described by $$G = \begin{pmatrix} -1 & -1 & 0 \\ 1 & -1 & 0 \\ 0 & 1 & -1 \end{pmatrix}^T. \quad (16)$$

The hexagonal lattice is the densest lattice in 2 dimensions, in the sense that it is the best way of packing disks. Similarly, the 3-dimensional stack of oranges lattice is the best packing of spheres. Many other classical lattices have been studied extensively, such as the Leech lattice in 24 dimensions, which is closely related to the Golay code and shares some of its unique properties.

The regular structure of lattices makes them amenable to fast search techniques. For some special lattices, such as the Leech lattice, there are highly specialized search techniques that exploit every available property. More generally, there are good general search techniques that apply to all lattices.

Spherical detection, which is one method that can be implemented within processing circuits 10 achieves the two desirable features of an aggressive fast search technique. First, a sphere is an easily identified search subset, and an inverse mapping of the received signal from the as-received signal space to the as-transmitted signal space provides a straightforward mechanism for placing the spherical subset in a region of highly likely candidates within the transmit signal space modulation. The design parameter influencing the reduced set size is the radius $\rho$ of the sphere used to capture the reduced set of candidates in the desired signal's modulation constellation. For additional related information, one may refer to E. Agrell, et al., "Closest Point Search in Lattices," IEEE Trans. Inform. Thy. (October 2000).

Considering the real AWGN scenario where the signal s is given by s=Gu, where u is a vector of integers representing information, G is the (N×N) generator matrix of a real lattice. Note that since the discussion includes complex numbers later, the more general complex number terminology throughout. The standard ML decoder finds the solution û by searching for the closest candidate Gu over all valid information vectors u:

$$\hat{u} = \arg_u \min\{\|r - Gu\|\}, \quad (17)$$

where $\|.\|$ is the Euclidean norm. For additional related information, one may refer to E. Viterbo and J. Boutros, "A Universal Lattice Code Decoder for Fading Channels, IEEE Trans. Inform. Thy., vol. 45, pp. 1639-1642, July 1999.

Spherical detection (SD) limits the search to those candidates u with $\|r-Gu\| \leq \rho$. To do so, it first identifies an initial estimate $\tilde{u}$, given by $$\tilde{u} = G^{-1} r. \quad (18)$$

Secondly, it maps the N-dimensional sphere of radius $\rho$ centered at r onto an N-dimensional ellipse centered at $\tilde{u}$. The ellipse is determined from G. It then searches over candidates in the ellipse for the solution u that minimizes $\|r-Gu\|$.

As the search progresses the radius is reduced, which in turn shrinks the size of the ellipse, thus speeding up the process. If the initial radius $\rho$ is chosen appropriately, the search is reduced drastically while the performance is almost as good as that of the true ML methodology. In order to facilitate the search over the ellipse, it is helpful to manipulate G into an upper triangular form.

Consider the matrix $F=G^H G$, where the superscript H indicates a Hermitian. It is possible to find an upper triangular matrix T such that $F=T^H T$. This can be done by Cholesky factorization of F. Using standard manipulations, one can write $$\|r-Gu\| = \|G(\tilde{u}-u)\| = \|T(\tilde{u}-u)\| \leq \rho. \quad (19)$$

The boundaries of the ellipse can be expressed by taking advantage of the structure of T. Starting from the N-th element $u_N$, we can write $$|T_{N,N}(\tilde{u}_N - u_N)| \leq \rho \quad (20)$$

Using the knowledge that elements of u are integers, we find the boundary values for $u_N$:

$$\left\lceil -\frac{\rho}{T_{N,N}} + \tilde{u}_N \right\rceil \leq u_N \leq \left\lfloor \frac{\rho}{T_{N,N}} + \tilde{u}_N \right\rfloor. \quad (21)$$

Working backwards, one can write $$|T_{N-1,N-1}(\tilde{u}_{N-1}-u_{N-1}) + T_{N-1,N}(\tilde{u}_N - u_N)| \leq \rho \quad (22)$$

and combine the boundary values for $u_N$ to obtain the boundary values for $u_{N-1}$. This process is continued sequentially for the remaining elements. Those skilled in the art will recognize that explicit expressions for the boundary values exist, and formulas exist for generating candidates u inside the ellipse.

In discussing a single iteration of the exemplary SD procedure that can be carried out using processing circuits 10, we let $\tilde{u}$ denote the current best candidate, and $d_{min}$ denote its corresponding distance. The SD method finds a new candidate u in the ellipse, and computes the distance $d=\|r-Gu\|$. If $d_{min} > d$, then the best candidate and its distance are updated to $\hat{u}=u$ and $d_{min}=d$. If $d < \rho$, then the radius of the sphere is updated to $\rho=d$, and the boundaries of the corresponding ellipse are adjusted accordingly.

Note that this guarantees that the next candidate will not have a larger distance than the current candidate. Then a new candidate is found, its distance is compared to the current $d_{min}$ and to the current $\rho$, and so on. Eventually, $\rho$ shrinks enough so there are no new candidates left in the ellipse, and the search ends.

The extension to the real fading case is achieved by absorbing the fading into the generator matrix. Incorporating fading into the real AWGN scenario, we have the general formulation $$r=Cs+v=CGu+v \quad (23)$$

Here C represents real fading coefficients, and the other quantities remain real, as before.

The discussion considers 3 cases of the dimension N of s and M of r, corresponding to different communication scenarios. In a first case, N=M. This case is very similar to the AWGN scenario. The fading is addressed by absorbing it into a new generator matrix $G_c = CG$. Except in the degenerate case, $C^{-1}$ exists, and the initial estimate is given by $$\tilde{u} = G_c^{-1} r = G^{-1} C^{-1} r. \quad (24)$$

Note that this is a zero-forcing solution, since $G_c\tilde{u}=r$. Also let $T_c$ the upper triangular matrix corresponding to $G_c$. Whereas in the AWGN scenario, the inverse $G^{-1}$ and the upper triangular matrix T could be computed offline, here the inverse $G_c^{-1}$ and the upper triangular matrix $T_c$ are computed for every new received block. Once these quantities are available, the SD steps are applied as before. In particular, this case applies to the scenario with one transmit and one receive antenna. Then r and s have the same size N, C is a diagonal matrix, and the diagonal elements represent the fading coefficients on the consecutive symbols of s. The computation of $G_c^{-1}$ and $T_c$ is simplified.

Where N>M, the receiver has more observations in r than unknowns in s. As expected, this is an advantage in general. The initial estimate $\tilde{u}$ is the LS estimate $$\tilde{u}=(G_c^H G_c)^{-1} G_c^H r. \qquad (25)$$

Note that, unlike the solution (16) for N=M, this solution is not zero forcing, since in general $G_c\tilde{u}\neq r$. This means that the LS estimate is able to distinguish between signal and noise and the remaining steps are unchanged. This case applies to scenarios with more receive than transmit antennas, or to systems with excess bandwidth, such as WCDMA.

Where N<M, the receiver has fewer observations in r than unknowns in s. However, in estimating $\tilde{u}$, it is possible to use a pseudo or "generalized" inverse $G_c^+$, which yields a minimum norm solution $\tilde{u}=G_c^+ r$. Such a solution is zero forcing, as in the case N=M. The remaining steps are unchanged.

Now, turning to the general complex fading scenario, u is a vector of integers representing information, G is the generator matrix of a complex lattice, s is the complex signal, and v is complex white Gaussian noise. Application of SD methods to this scenario considers the following matrix equation over complex numbers $$Ax=y, \qquad (26)$$

where x can be expressed in terms of its real and imaginary parts as $x=x_{real}+jx_{imag}$, and similarly for y and A.

In the present context, it is useful to express (26) as a real matrix equation. We define the real quantities $$\bar{A}=\begin{pmatrix} A_{real} & -A_{imag} \\ A_{imag} & A_{real} \end{pmatrix}, \qquad (27)$$

$\bar{x}=(x_{real}, x_{imag})^T$, and $\bar{y}=(y_{real}, y_{imag})^T$. Then it is easy to check that $$\bar{A}\bar{x}=\bar{y}. \qquad (28)$$

In this reformulation, vector and matrix dimensions are doubled accordingly. This reformulation enables processing circuit 10 to apply SD to the more general problem. Note that even though the initial estimate $\tilde{u}$ is real because information vector u is integer, the estimate can be made simply by forcing the imaginary part $\tilde{u}_{imag}$ to zero.

Processing circuit 10 also may be configured to apply SD methods to circular singular modulation spaces, such as Phase Shift Keying. This formulation does not use the lattice code assumptions of s=Gu and instead treats the signal s as a point chosen from some constellation. Moreover, its focus is on detecting s itself, and the assumption is that the corresponding information is obtained indirectly. In the context of the previous section, the equivalent generator matrix is $G_c=C$.

Recall the boundary inequality (20), which is restated in terms of s:

$$|T_{N,N}(\tilde{s}_N-s_N)|\leq\rho. \qquad (29)$$

Since $s_N$ and $\tilde{s}_N$ are complex, (29) describes a disk of radius $\rho/|T_{N,N}|$ centered at $\tilde{s}_N$ in the complex plane. The remaining boundary conditions are interpreted as before. It is straightforward to identify the intersection of a disk and a circular constellation. This makes the modified SD well suited for PSK modulation. Indeed, an exemplary method of handling non-circular constellations such as QAM is to treat them as a union of concentric PSK sets. The modified SD has the same general form as the original SD. In addition to the different boundary conditions, it searches the ellipse by traveling on circle trajectories instead of an integer grid. For scenarios that can be handled by either version of the SD, for instance QAM, the modified SD may be more computationally efficient owing to the reduced number of dimensions. For additional related information, one may refer to B. Hoschwald and S. ten Brink, "Achieving Near-capacity on a Multiple-antenna Channel," IEEE Trans. Comm. vol. 51, pp. 389-399, March 2003.

Figure 8:
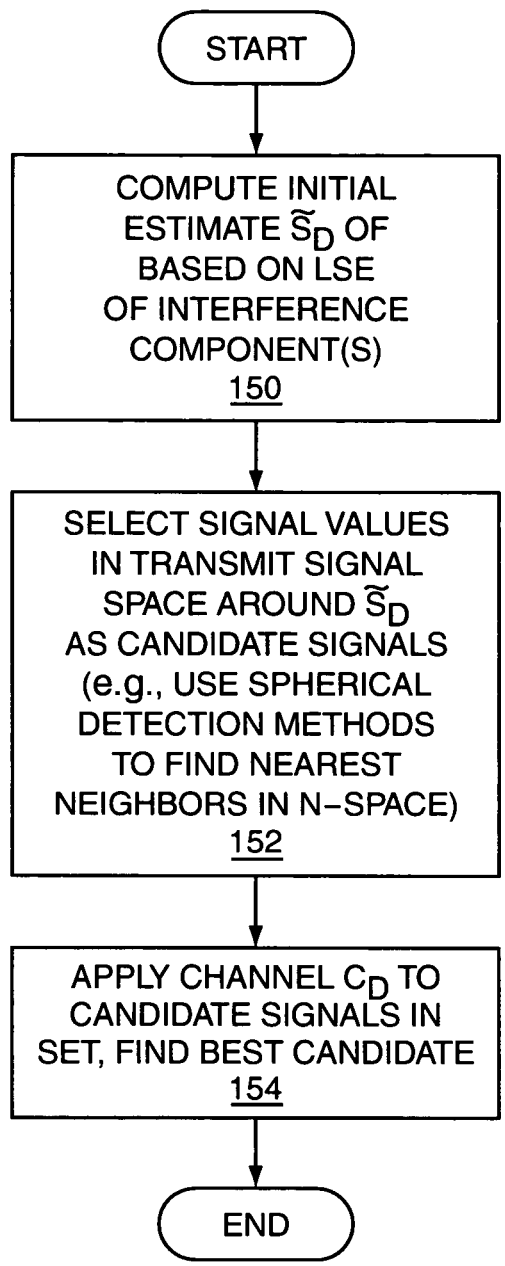
FIG. 8 is a diagram of exemplary fast search processing according to one or more embodiments of the present invention.

In any case, FIG. 8 illustrates an exemplary processing logic wherein processing circuit 10 is configured with fast search circuit 16, and thus is configured to gain demodulation efficiency by reducing the candidate signal search space.

The baseline SD method finds an initial estimate of the desired signal within the transmit signal space of the desired signal by applying the generalized inverse desired signal channel estimate as $$\tilde{s}_D=C_D^+ r. \qquad (30)$$

Fast search circuit 16 then re-computes the initial estimate of the desired signal such that its transposition to the transmit signal space considers the effects of the interferer signal(s), which effects are, as before, obtained through least-squares estimation. Thus, incorporating the interference component can be expressed as $$\begin{cases} \tilde{s}_D = C_D^+(r-\tilde{r}_I) \\ \tilde{r}_I = C_I C_I^+(r-C_D s_D). \end{cases} \qquad (31)$$

Processing circuits 10 can be configured to solve (31) iteratively or by solving a combined equation given as $$(I-C_D^+ C_I C_I^+ C_D)\tilde{s}_D=C_D^+(I-C_I C_I^+)r, \qquad (32)$$

whereupon the initial estimate can be found by inversion or by a numerical method. In any case, once the interference-adjusted initial estimate has been found in the transmit signal space of the desired signal (Step 150), the distance calculation from it to each candidate signal in the search space ellipse can be modified to include a least squares estimate of the interferer signal component as $$\|r-C_D s-\tilde{r}_I\| \text{ (Step 152)}. \qquad (33)$$

Thus, the least squares estimated interference component(s) are used to locate the ellipse and to compute the subsequent distance-based search in the transmit signal space of the desired signal. Candidate signals $s_{D,k}\in S_{Reduced}$ are then translated back into the received signal space by applying the desired signal channel estimate to them (Step 154), and demodulation using the reduced candidate set can be carried out as described above.

As noted, the above fast search method(s) optionally are implemented in processing circuits 10 by the inclusion of hardware, software, or some combination thereof functionally to implement fast search circuit 16. Of course, more generally, processing circuits 10 at least implement LSIS circuit 14 such that exemplary least-squares interference suppression can be carried out as part of the demodulation process. As noted, such demodulation can be based on candidate set residual evaluations, or on lattice-based demodulation with interference-suppressed branch metrics.

As such, it should be understood that an exemplary receiver can exploit its knowledge of interferer signal components as gained through least squares estimation in a number of ways, depending on design preferences, performance goals, etc. Therefore, the above details are exemplary only and do not limit the present invention. Indeed, the present invention is limited only by the following claims and their reasonable equivalents.

What is claimed is:

1. A method of suppressing interference in a received signal that includes a desired signal, the method comprising:
    generating a set of desired signal hypotheses based on performing spherical detection within a transmit signal space corresponding to the desired signal;
    estimating one or more interference components via least squares estimations based on interferer signal channel estimates by estimating an interference component of the received signal for each one in the set of desired signal hypotheses; and
    demodulating the received signal to recover the desired signal based at least in part on the interference components.

2. The method of claim 1, wherein demodulating the received signal to recover the desired signal based at least in part on the interference components comprises identifying a best hypothesis from the set of desired signal hypotheses by determining a first residual between the received signal and each hypothesis, determining a second residual between each first residual and the corresponding interference component, and evaluating the second residuals.

3. The method of claim 1, further comprising identifying a locus for spherical detection within the transmit signal space based at least in part on interferer signal channel estimates associated with the one or more interference components.

4. A method of suppressing interference in a received signal that includes a desired signal, the method comprising:
    generating a first residual between the received signal and each candidate signal in a set of candidate signals, wherein each candidate signal is postulated as the desired signal;
    calculating an interference component for each first residual as a least squares estimate;
    generating a second residual from each first residual by removing the corresponding interference component; and
    determining a best candidate signal by evaluating the second residuals based on identifying a smallest second residual and selecting the corresponding candidate signal as a best candidate for the desired signal.

5. The method of claim 4, wherein calculating an interference component for each first residual as a least squares estimate comprises performing a least squares estimate of the interference component based on interferer signal channel estimates and the first residual.

6. The method of claim 5, further comprising generating the interferer signal channel estimates based on receiving one or more pilot or other reference signals from one or more remote transmitters that are presumed to originate one or more interfering signals.

7. The method of claim 4, wherein generating a first residual between the received signal and each candidate signal in a set of candidate signals, wherein each candidate signal is postulated as the desired signal, comprises determining a difference between the received signal and each candidate signal in the set of candidate signals after applying desired signal channel estimates to the candidate signal.

8. The method of claim 4, wherein generating a second residual from each first residual by removing the corresponding interference component comprises determining a difference between the first residual and the interference component.

9. The method of claim 4, further comprising determining the set of candidate signals according to a reduced search space using spherical detection methods in a transmit signal space to constrain the size of the set of candidate signals.

10. The method of claim 4, further comprising:
    computing an initial desired signal estimate in a transmit signal space based on a least squares estimate of an interference component in the received signal and an inverse desired signal channel estimate;
    selecting candidate signals for inclusion in the set of candidate signals based on using spherical detection in the transmit signal space; and
    applying a desired signal channel estimate to the selected candidate signals to convert them to a received signal space for calculation of corresponding first residuals.

11. The method of claim 4, wherein the received signal includes a plurality of interferer signals, and wherein calculating an interference component for each first residual as a least squares estimate comprises jointly estimating an interference contribution of two or more of the interferer signals.

12. The method of claim 11, wherein generating the second residual comprises removing the jointly estimated interference component from the first residual.

13. The method of claim 4, wherein the received signal includes a plurality of interferer signals, and wherein calculating an interference component for each first residual as a least squares estimate comprises successively estimating interference contributions for two or more of the interferer signals.

14. The method of claim 13, further comprising generating the second residual by successively removing the estimated interference contributions from the first residual.

15. A receiver circuit for suppressing interference in a received signal that includes a desired signal, the circuit comprising one or more processing circuits configured to:
    generate a first residual between the received signal and each candidate signal in a set of candidate signals, wherein each candidate signal is postulated as the desired signal;
    calculate an interference component for each first residual as a least squares estimate;
    generate a second residual from each first residual by removing the corresponding interference component; and
    determine a best candidate signal by evaluating the second residuals based on identifying a smallest second residual and selecting the corresponding candidate signal as a best candidate for the desired signal.

16. The receiver circuit of claim 15, wherein the receiver circuit is configured to calculate an interference component for each first residual as a least squares estimate by performing a least squares estimate of the interference component based on interferer signal channel estimates and the first residual.

17. The receiver circuit of claim 16, wherein the receiver circuit is configured to generate the interferer signal channel estimates based on receiving one or more pilot or other reference signals from one or more remote transmitters that are presumed to originate one or more interfering signals.

18. The receiver circuit of claim 15, wherein the receiver circuit is configured to generate a first residual between the received signal and each candidate in a set of candidate signals, wherein each candidate signal is postulated as the desired signal, by determining a difference between the received signal and the candidate signal after applying desired signal channel estimates to the candidate signal.

19. The receiver circuit of claim 15, wherein the receiver circuit is configured to generate a second residual from each first residual by removing the corresponding interference component based on determining a difference between the first residual and the interference component.

20. The receiver circuit of claim 15, wherein the receiver circuit is configured to determine the set of candidate signals according to a reduced search space by using spherical detection methods in a transmit signal space to constrain the size of the set of candidate signals.

21. The receiver circuit of claim 15, wherein the receiver circuit is configured to:
  compute an initial desired signal estimate in a transmit signal space based on a least squares estimate of an interference component in the received signal and an inverse desired signal channel estimate;
  select candidate signals for inclusion of the set of candidate signals using spherical detection in the transmit signal space; and
  apply a desired signal channel estimate to the selected candidate signals to convert them to a received signal space for calculation of corresponding first residuals.

22. The receiver circuit of claim 15, wherein the received signal includes a plurality of interferer signals, and wherein the receiver circuit is configured to calculate an interference component for each first residual as a least squares estimate by jointly estimating an interference contribution of two or more of the interferer signals.

23. The receiver circuit of claim 22, wherein the receiver circuit is configured to generate the second residual by removing the jointly estimated interference component from the first residual.

24. The receiver circuit of claim 15, wherein the received signal includes a plurality of interferer signals, and wherein the receiver circuit is configured to calculate an interference component for each first residual as a least squares estimate by successively estimating interference contributions for two or more of the interferer signals.

25. The receiver circuit of claim 24, wherein the receiver circuit is configured to generate the second residual by successively removing the estimated interference contributions from the first residual.

26. The receiver circuit of claim 15, wherein the receiver circuit comprises a Wideband CDMA receiver circuit.

27. The receiver circuit of claim 9, wherein the receiver circuit comprises at least a portion of a wireless communication receiver in a Wideband CDMA communication terminal.

28. A method of suppressing interference in a received signal that includes a desired signal, the method comprising:
  generating a first residual between the received signal and each candidate signal in a set of candidate signals, wherein each candidate signal is postulated as the desired signal;
  calculating an interference component for each first residual as a least squares estimate;
  generating a second residual from each first residual by removing the corresponding interference component; and
  determining a best candidate signal by evaluating the second residuals by:
    identifying a smallest one of the second residuals;
    determining whether the corresponding interference component is rational and, if so, selecting the candidate signal associated with the smallest second residual as a best candidate for the desired signal.

29. The method of claim 28, further comprising, if the corresponding interference component is not rational, selecting the candidate signal corresponding to a smallest one of the first residuals as the best candidate for the desired signal.

30. The method of claim 28, wherein determining whether the corresponding interference component is rational comprises applying an inverse interferer channel estimate to the interference component to obtain an estimated interferer signal and determining whether the estimated interferer signal comports to transmission characteristics known or presumed for the estimated interferer signal.

31. A method of suppressing interference in a received signal that includes a desired signal, the method comprising:
  generating a first residual between the received signal and each candidate signal in a set of candidate signals, wherein each candidate signal is postulated as the desired signal;
  calculating an interference component for each first residual as a least squares estimate;
  generating a second residual from each first residual by removing the corresponding interference component; and
  determining a best candidate signal by evaluating the second residuals by:
    identifying a smallest one of the second residuals;
    bounding the corresponding interference component as needed according to one or more interferer signal characteristics; and
    selecting the candidate signal associated with the smallest second residual as a best candidate for the desired signal.

32. The method of claim 31, wherein bounding the corresponding interference component comprises clipping it to a modulation envelope range consistent with transmission characteristics known or presumed for an interfering signal associated with the interference component.

33. A method of suppressing interference in a received signal that includes a desired signal, the method comprising:
  generating a first residual between the received signal and each candidate signal in a set of candidate signals, wherein each candidate signal is postulated as the desired signal;
  calculating an interference component for each first residual as a least squares estimate;
  generating a second residual from each first residual by removing the corresponding interference component; and
  determining a best candidate signal by evaluating the second residuals by:
    determining whether the interference component associated with a smallest one of the second residuals is a valid estimate by determining whether it comports with known or presumed transmit signal characteristics;
    if the interference component is not a valid estimate, identifying a smallest first residual and selecting the corresponding candidate signal as a best candidate for the desired signal; and
    if the interference component is a valid estimate, selecting the candidate signal corresponding to the smallest second residual as a best candidate for the desired signal.

34. A receiver circuit for suppressing interference in a received signal that includes a desired signal, the circuit comprising one or more processing circuits configured to:
- generate a first residual between the received signal and each candidate signal in a set of candidate signals, wherein each candidate signal is postulated as the desired signal;
- calculate an interference component for each first residual as a least squares estimate;
- generate a second residual from each first residual by removing the corresponding interference component; and
- determine a best candidate signal by evaluating the second residuals based on identifying a smallest one of the second residuals, determining whether the corresponding interference component is rational and, if so, selecting the candidate signal associated with the smallest second residual as a best candidate for the desired signal.

35. The receiver circuit of claim 34, wherein the receiver circuit is configured to select the candidate signal corresponding to a smallest one of the first residuals as the best candidate for the desired signal if the interference component corresponding to the smallest second residual is not rational.

36. The receiver circuit of claim 34, wherein the receiver circuit is configured to determine whether the corresponding interference component is rational by applying an inverse interferer channel estimate to the interference component to obtain an estimated interferer signal and determining whether the estimated interferer signal comports to transmission characteristics known or presumed for the estimated interferer signal.

37. A receiver circuit for suppressing interference in a received signal that includes a desired signal, the circuit comprising one or more processing circuits configured to:
- generate a first residual between the received signal and each candidate signal in a set of candidate signals, wherein each candidate signal is postulated as the desired signal;
- calculate an interference component for each first residual as a least squares estimate;
- generate a second residual from each first residual by removing the corresponding interference component; and
- determine a best candidate signal by evaluating the second residuals based on identifying a smallest one of the second residuals, bounding the corresponding interference component as needed according to one or more interferer signal characteristics, and selecting the candidate signal associated with the smallest second residual as a best candidate for the desired signal.

38. The receiver circuit of claim 37, wherein the receiver circuit is configured to bound the corresponding interference component by clipping it to a modulation envelope range consistent with transmission characteristics known or presumed for an interfering signal associated with the interference component.

39. A receiver circuit for suppressing interference in a received signal that includes a desired signal, the circuit comprising one or more processing circuits configured to:
- generate a first residual between the received signal and each candidate signal in a set of candidate signals, wherein each candidate signal is postulated as the desired signal;
- calculate an interference component for each first residual as a least squares estimate;
- generate a second residual from each first residual by removing the corresponding interference component; and
- determine a best candidate signal by evaluating the second residuals based on:
  - determining whether the interference component associated with a smallest one of the second residuals is a valid estimate by determining whether it comports with known or presumed transmit signal characteristics;
  - if the interference component is not a valid estimate, identifying a smallest first residual and selecting the corresponding candidate signal as a best candidate for the desired signal; and
  - if the interference component is a valid estimate, selecting the candidate signal corresponding to the smallest second residual as a best candidate for the desired signal.

* * * * *

UNITED STATES PATENT AND TRADEMARK OFFICE
CERTIFICATE OF CORRECTION

PATENT NO. : 8,804,883 B2  
APPLICATION NO. : 10/863299  
DATED : August 12, 2014  
INVENTOR(S) : Khayrallah It is certified that error appears in the above-identified patent and that said Letters Patent is hereby corrected as shown below:

In the Specification

In Column 6, Line 36, delete "$\hat{r}[s_{D,k}]$" and insert -- $\tilde{r}_l[s_{D,k}]$ --, therefor.

In Column 7, Line 17, delete "produce $\hat{s}_D$ estimate SD as" and insert -- produce an estimate $\hat{s}_D$ as --, therefor.

In Column 12, Line 19, delete "$|T_{N,N}(\tilde{u}_N - u_N)| \leq \rho$" and insert -- $|T_{N,N}(\tilde{u}_N - u_N)| \leq \rho$ --, therefor.

In Column 12, Line 30, delete "$(\tilde{u}_{N-1} u_{N-1})$" and insert -- $(\tilde{u}_{N-1} - u_{N-1})$ --, therefor.

Signed and Sealed this  
Twenty-sixth Day of May, 2015

Michelle K. Lee  
*Director of the United States Patent and Trademark Office*

Page 1 of 1